Patented Oct. 20, 1925.

1,558,241

UNITED STATES PATENT OFFICE.

ORVILLE ADALBERT DAFERT-SENSEL-TIMMER, OF VIENNA, AUSTRIA.

MEDICAL COMPOUND AND PROCESS FOR MANUFACTURING THE SAME.

No Drawing.  Application filed December 15, 1924.  Serial No. 756,061.

*To all whom it may concern:*

Be it known that I, ORVILLE ADALBERT DAFERT-SENSEL-TIMMER, a citizen of the Austrian Republic, residing at Vienna, Austria, have invented a certain new and useful Medical Compound and Process for Manufacturing the Same, of which the following is a specification.

This invention relates to a new medicine in which the medicinal effect of quinine is combined with that of arsenic, which combination has been desired for a long time. I have discovered, that upon treating quinine or its salts with halogen compounds of arsenic, I can produce new compounds which have the two effects above noted, and which are particularly effective in combatting diseases caused by organisms having entered the blood. These medicines may be administered by intravenous or intramuscular injection.

The reaction between the quinine and the arsenic compound can be carried out under certain conditions in order to yield a reaction product which may be easily isolated in a pure state. When solid quinine bases are treated with an excess of trichloride of arsenic the temperature rises and a gummy substance is obtained which can be crystallized only with difficulty. Experiments have shown that the reaction must be brought about in an inert reaction vehicle which is a solvent for the starting materials, in order to avoid the difficulty of several recrystallizations. A suitable reaction vehicle is for instance chloroform, which easily dissolves the original materials, while the reaction product being insoluble therein, is precipitated. By working with the said liquid I obtain well-formed crystals readily soluble in water, without danger of decomposition; this allows of an easy dosage and manipulation of the new medicine. By altering the proportions of the components or the temperature of the reaction the amount of quinine and of the halogen compound of arsenic entering into the final product may be varied. If quinine salts or different quinine bases are used, a series of new compounds of similar properties may be obtained. In all these compounds, arsenic is not present as ionizable arsenic.

*Example 1.*—5 grams of trichloride of arsenic dissolved in 200 grams of chloroform are poured into a solution of 5 grams of anhydrous quinine hydrochloride in 150 grams of chloroform, the mixture being preferably stirred and care being taken that the temperature does not rise above 16° C. A crystal pulp is gradually formed which contains fine needles in chloroform, which is allowed to stand for 24 hours to allow completion of the separation from the mother liquor. The crystal pulp is then washed on a filter flask or the like with chloroform and is then freed from the main portion of the obstinately adhering chloroform by drying in vacuo and finally by drying in a drying oven at 100° C. If the mass is not stirred during the precipitation, formation of spherical agglomerations of crystals may sometimes occur.

The product is highly hygroscopic, and decomposes without melting at above 100° C. The compound is slightly soluble in chloroform, but readily soluble in water and soluble in ethyl and methyl alcohol. The analysis which corresponds with the determination of toxic efficiency, shows a molecular ratio of hydrochloride of quinine to arsenic trichloride of 1:1, if the above noted quantities are used, and above noted temperature conditions followed.

The results of the analysis are as follows:—

| As | Cl | N | C | H | |
|---|---|---|---|---|---|
| 13.83 | 26.17 | 5.17 | 44.28 | 4.65 | calculated. |
| 13.80 | 26.07 | 5.09 | 44.19 | 4.79 | found. |
| 13.72 | 26.10 | 5.11 | 44.15 | 4.83 | found. |

From these figures, I believe the formula to be $C_{20}H_{25}O_2H_2AsCl_4$.

*Example 2.*—The solutions of the starting materials are prepared as described in Example 1 and are allowed to react at 25 to 35° C. If the further treatment is according to Example 1 the resulting compounds are water soluble. In a modified form of execution, the molecular ratio of quinine hydrochloride to arsenic chlorid may be 1:1 or 2:1 or 3:1 or 4:1. The compounds produced when using such ratios, also may be dosed in accordance with their arsenic contents and are very suitable for therapeutic use.

*Example 3.*—By working with the free base, quinine, instead of the corresponding amount of quinine hydrochloride as stated in Examples 1 and 2, or with other quinine bases, for instance chinidine or if desired with a different halogen compound of arsenic for instance arsenic trifluoride, similar new compounds are obtained.

As above stated, quinine, its salts such as hydrochloride, quinine bases (e. g. chinidine) can be employed, I refer to this class of materials hereinafter, under the expression "a quinine compound."

What I claim is:—

1. A process which comprises reacting with a halide of arsenic, upon quinine compound, to form a double compound thereof.

2. A process which comprises reacting with a halide of arsenic, upon a quinine compound both being dissolved in an organic easily volatile solvent to form a double compound thereof.

3. A process which comprises reacting with a halide of arsenic upon a quinine compound both being dissolved in chloroform, to form a double compound thereof.

4. A process which comprises reacting with a halide of arsenic upon a quinine compound while at not above 16° C., to form a double compound thereof.

5. A process which comprises reacting with an arsenic chloride upon a quinine compound to form a double compound thereof.

6. A new medicine having the medicinal effects of quinine and arsenic, and useful in the treatment of diseases caused by organisms in the blood, the same being a crystalline body, soluble in water but not readily soluble in chloroform, and consisting of a double compound of a halide of arsenic with a quinine compound.

7. As a new product, a compound of the formula $C_{20}H_{25}O_2N_2AsCl_4$.

In testimony whereof I hereunto affix my signature.

ORVILLE ADALBERT DAFERT-SENSEL-TIMMER.